(12) United States Patent
Oosumi

(10) Patent No.: US 8,056,323 B2
(45) Date of Patent: Nov. 15, 2011

(54) METHOD OF CONTROLLING EXHAUST GAS PURIFICATION SYSTEM AND EXHAUST GAS PURIFICATION SYSTEM

(75) Inventor: Kazuo Oosumi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 712 days.

(21) Appl. No.: 12/085,771

(22) PCT Filed: Nov. 22, 2006

(86) PCT No.: PCT/JP2006/323293
§ 371 (c)(1),
(2), (4) Date: May 30, 2008

(87) PCT Pub. No.: WO2007/069436
PCT Pub. Date: Jun. 21, 2007

(65) Prior Publication Data
US 2009/0165444 A1    Jul. 2, 2009

(30) Foreign Application Priority Data
Dec. 14, 2005  (JP) ................... 2005-360282

(51) Int. Cl.
*F01N 3/00* (2006.01)
(52) U.S. Cl. ............... 60/286; 60/274; 60/276; 60/295; 60/301; 60/303
(58) Field of Classification Search .............. 60/274, 60/276, 280, 286, 295, 297, 301, 303
See application file for complete search history.

(56) References Cited

U.S. PATENT DOCUMENTS

| | | | | |
|---|---|---|---|---|
| 5,444,974 A | * | 8/1995 | Beck et al. | 60/274 |
| 5,996,337 A | * | 12/1999 | Blosser et al. | 60/274 |
| 6,199,372 B1 | * | 3/2001 | Wakamoto | 60/274 |
| 6,269,633 B1 | | 8/2001 | van Nieuwstadt et al. | |
| 6,901,744 B2 | * | 6/2005 | Kako et al. | 60/285 |
| 6,901,747 B2 | * | 6/2005 | Tashiro et al. | 60/286 |

(Continued)

FOREIGN PATENT DOCUMENTS
EP        1515017        3/2005
(Continued)

OTHER PUBLICATIONS

European Search Report dated Jan. 29, 2010 in Application No. 06833115.6.

(Continued)

*Primary Examiner* — Binh Q. Tran
(74) *Attorney, Agent, or Firm* — Staas & Halsey LLP

(57) ABSTRACT

In an exhaust gas purification system provided with an exhaust gas purification device in an exhaust passage of an internal combustion engine, and at the same time, provided with a reductant supply means for supplying a reductant to the upstream side of this exhaust gas purification device, two or more of the oxygen concentration, the CO concentration, and the HC concentration of the exhaust gas detected by an exhaust gas component concentration detecting means are used as control parameters during the reductant supply control when the reductant is supplied into the exhaust gas flowing into the exhaust gas purification device. With this, the supply period and supply amount of the reductant can be optimized, and a decrease of fuel efficiency deterioration and suppression of deterioration of the quality of the components of the exhaust gas flowing into the atmosphere are attempted.

6 Claims, 7 Drawing Sheets

U.S. PATENT DOCUMENTS

| | | | | |
|---|---|---|---|---|
| 7,707,821 B1 * | 5/2010 | Legare | ............................ | 60/277 |
| 7,716,918 B2 * | 5/2010 | Gabe et al. | ...................... | 60/286 |
| 2002/0073692 A1 | 6/2002 | Katashiba et al. | | |
| 2004/0083719 A1 | 5/2004 | Xu et al. | | |

FOREIGN PATENT DOCUMENTS

| | | |
|---|---|---|
| EP | 1529933 | 5/2005 |
| JP | 5-171921 | 7/1993 |
| JP | 7-34936 | 2/1995 |
| JP | 10-8950 | 1/1998 |
| JP | 10-252544 | 9/1998 |
| JP | 11-270327 | 10/1999 |
| JP | 2000-110553 | 4/2000 |
| JP | 2002-195074 | 7/2002 |
| JP | 2004-044515 | 2/2004 |

OTHER PUBLICATIONS

Patent Abstracts of Japan, Publication No. 10-252544, Published Sep. 22, 1998.
Patent Abstracts of Japan, Publication No. 2002-195074, Published Jul. 10, 2002.
Patent Abstracts of Japan, Publication No. 2004-044515, Published Feb. 12, 2004.
International Search Report for corresponding international application PCT/JP2006/323293, mailed Feb. 27, 2007.
Japanese Office Action dated May 10, 2011 in Appln. No. 2005-360282.
Patent Abstracts of Japan, Publication No. 10-008950, Published Jan. 13, 1998.

* cited by examiner

[$O_2$ Concentration: 5%]

[$O_2$ Concentration: 10%]

METHOD OF CONTROLLING EXHAUST GAS PURIFICATION SYSTEM AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/323293, filed Nov. 22, 2006 which claimed priority to Japanese Application No. 2005-360282, filed Dec. 14, 2005 in Japan, the contents of which are incorporated herein by reference.

TECHNICAL FIELD

The present invention relates to a method of controlling an exhaust gas purification system and an exhaust gas purification system provided with an exhaust gas purification device and a reductant supply means that supplies a reductant in the upstream side in order to purify the exhaust gas of an internal combustion engine.

BACKGROUND ART

Various research and proposals have been made on an exhaust gas purification device to purify exhaust gas of an internal combustion engine such as a diesel engine and some gasoline engines. In these, an exhaust gas purification device is used in which a DPF (diesel particulate filter) and a NOx purification catalyst that purifies NOx (nitrogen oxides) are arranged. A three way catalyst, a NOx adsorption catalyst, an SCR catalyst (selective contact catalyst) in which urea is added, a NOx direct reduction type catalyst, etc. are used as the NOx purification catalyst.

Then, an oxidization catalyst is arranged in the upstream side of the DPF or NOx purification catalyst in the exhaust gas purification device of a diesel engine. Then, the temperature of the oxidization catalyst and the temperature of the exhaust gas in the downstream side of the oxidization catalyst is increased in the case that the temperature of the exhaust gas is low by supplying a reductant such as HC into the exhaust gas with a post injection or an exhaust pipe injection and oxidizing this reductant with the oxidization catalyst. With this increase of temperature, the temperature of this oxidization catalyst is kept at an activation temperature or more, and at the same time, PM combustion in the DPF in the downstream side is promoted. Further, the temperature of the NOx purification catalyst in the downstream side is kept at the activation temperature or more.

Further, a reaction from NO to $NO_2$ is promoted with this oxidization catalyst in an exhaust gas purification device in which the oxidization catalyst is arranged in the upstream side of the SCR catalyst. With this, a reaction with $NH_3$ (ammonia) on the SCR catalyst is promoted.

This oxidization catalyst exhibits an action effect such as oxidizing CO, HC, and NO in addition to increasing the temperature of the exhaust gas, and also has a role to secure the promotion of combustion of PM in the DPF in the downstream side by $NO_2$, and the performance of the NOx purification catalyst. The configuration, the composition, and the carrying amount of this oxidization catalyst are selected that are appropriate for each usage.

Further, a NOx adsorption catalyst is carried on the DPF without providing the oxidization catalyst in the upstream side as described in Japanese Patent Application Kokai Publication No. 2004-44515. In this system, a reductant such as HC is supplied into the exhaust gas with a post injection or an exhaust pipe injection in the case that the temperature of the exhaust gas is low. The temperature of the DPF with a catalyst is increased through oxidizing this reductant with the NOx adsorption catalyst, and the PM combustion in the DPF is promoted.

Then, the supply of the reductant in these devices is controlled with an activation temperature of the catalyst such as an oxidation catalyst carried in the exhaust gas purification device as a standard. That is, when the temperature of the exhaust gas flowing into this catalyst or the temperature of the catalyst is at the activation temperature or less, stops the supply of the reductant is stopped and the supply of the reductant is begun when the temperature becomes in a state of exceeding the activation temperature.

However, in the conventional art, the supply period and the supply amount of this reductant are in control as a function of only the temperature of the catalyst such as an oxidation catalyst or the temperature of the exhaust gas, and it was considered to have no relationship with the oxygen concentration, the CO concentration, and the HC concentration that give large influence to the oxidization of the reductant. Because of that, an appropriate amount of the reductant cannot be supplied at an appropriate period. As a result, there has been a problem that the performance of increasing the temperature of the catalyst cannot be sufficiently exhibited and a problem that mileage deterioration and deterioration of the exhaust gas component occur due to supplying an extra amount of the reductant.

On the other hand, an exhaust purification device in which the oxygen concentration in the exhaust gas is considered when supplying the reductant has been proposed. For example, as described in Japanese Patent Application Kokai Publication No. 2002-195074, an exhaust purification device of an engine as following is proposed in which NOx is purified by supplying the reductant consisting of HC, etc. into the exhaust gas with a post injection and reacting this reductant with NOx by using the NOx purification catalyst device. In this device, whether the NOx purification catalyst is in an active state or not is determined by the catalyst temperature, etc. With this determination result, the injection amount and the injection period of the post injection are changed, and the NOx discharging amount into the exhaust gas is made less in an inactive state. Further, the injection amount and the injection period of the post injection are set so that the reductant amount supplied to the NOx purification catalyst can be sufficiently secured in an active state. With this, the NOx release into the atmosphere is effectively suppressed, and the exhaust gas can be purified.

Further, an exhaust purification device of an internal combustion engine as described in Japanese Patent Application Kokai Publication No. 10-252544 has been proposed for example. In this device, the HC supply amount actually supplied into the exhaust gas is estimated based on the oxygen concentration in the exhaust gas in the case of supplying HC into the exhaust gas with a post injection. The post injection is controlled so that the actual HC supply amount is agreed with the objective value of the HC supply amount to be supplied.

However, the relationship of the oxygen concentration with the activation temperature characteristics (light off characteristics) of the catalyst is not referred to in these exhaust purification devices, and nothing more than the oxygen concentration is used only in order to estimate the HC supply amount actually supplied into the exhaust gas.

Patent Document 1: Japanese Patent Application Kokai Publication No. 2004-44515

Patent Document 2: Japanese Patent Application Kokai Publication No. 2002-195074

Patent Document 3: Japanese Patent Application Kokai Publication No. 10-252544

DISCLOSURE OF THE INVENTION

Problems to be Solved by the Invention

The present invention was performed to solve the above-described problems, and its objective is to provide a method of controlling an exhaust gas purification system and the exhaust gas purification system provided with an exhaust gas purification device and a reductant supply means that supplies a reductant in the upstream side in order to purify the exhaust gas of an internal combustion engine, that is capable of attempting minimization of mileage deterioration and inhabitation of deterioration of exhaust gas components outflowing into the atmosphere by making the supply period and the supply amount of the reductant optimum.

SUMMARY OF THE INVENTION

The method of controlling an exhaust gas purification system to achieve the objectives as described above provided with an exhaust gas purification device in an exhaust passage of an internal combustion engine, and at the same time, provided with a reductant supply means that supplies the reductant into the exhaust gas flowing into said exhaust gas purification device while adjusting the supply amount and the supply period of the reductant, an exhaust gas temperature detection means that detects a temperature of the exhaust gas, and an exhaust gas component concentration detection means that detects the oxygen concentration, the CO concentration, and the HC concentration in the exhaust gas, that has a control device such that said reductant supply means performs a control of the supply of the reductant into the exhaust gas flowing into said exhaust gas purification device when the temperature of the exhaust gas detected with said exhaust gas temperature detection means is given judgment temperature or higher, is characterized in that two or more of the oxygen concentration, the CO concentration, and the HC concentration of the exhaust gas detected by using said exhaust gas component concentration detection means are used as a control parameter at the time of the reductant supply control of the supply of the reductant.

With this configuration, the performance of the oxidation catalyst can be brought out sufficiently by making the supply amount and the supply period of the reductant optimum. With this, minimization of mileage deterioration, and at the same time, inhabitation of deterioration of the exhaust gas component at the reductant injection can be attempted.

Moreover, there is a device as described below as the exhaust gas purification device having the upstream oxidation catalyst, and the reductant is supplied into the exhaust gas during regeneration and desulfurization of each device.

In the exhaust gas purification device having the upstream oxidation catalyst and the downstream DPF, the reductant is supplied when PM deposited on the DPF is combusted and removed. Further, in the exhaust gas purification device having the upstream oxidation agent and the downstream NOx adsorption catalyst, the reductant is supplied at the regeneration control to recover the NOx occlusion ability of the NOx adsorption catalyst. Further, there is an exhaust gas purification device in which the DPF and the NOx adsorption catalyst are arranged downstream to the upstream oxidation agent, and in which the most downstream oxidation agent is added.

Further, there is a case that the reductant also uses a unburnt fuel such as HC (hydrocarbon), and also a case of using an ammonia-based solution such as urea water in the SCR catalyst. The reductant that is optimized for a supply purpose of the catalyst and the reductant is appropriately used. Further, related to its supply method, there is a case of providing an injection valve injecting the reductant into an exhaust pipe and supplying the reductant into the exhaust gas from this injection valve, and a case of supplying the unburnt fuel into the exhaust gas with a post injection in the fuel injection inside the cylinder.

Further, when supplying the reductant in the above-described method of controlling the exhaust gas purification system, said judgment temperature is set from the oxygen concentration, the CO concentration, and the HC concentration of the exhaust gas flowing into said exhaust gas purification device that are detected with said exhaust gas component concentration detection means based on the relationship of the oxygen concentration, the CO concentration, and the HC concentration of the exhaust gas flowing into said exhaust gas purification device with the prescribed judgment temperature. In other words, the relationship of the oxygen concentration, the CO concentration, and the HC concentration with the light-off is added as a control parameter of the reductant supply control. With this, the prescribed judgment temperature can be made to be appropriate, and the supply starting time of the reductant can be attempted to become optimum.

Further, when supplying the reductant in the above-described method of controlling the exhaust gas purification system, the supply amount of the reductant supplied into the exhaust gas is calculated and set from the temperature, the oxygen concentration, and the CO concentration, and the HC concentration of the exhaust gas flowing into the above-described exhaust gas purification device based on the relationship of the temperature, the oxygen concentration, the CO concentration of the exhaust gas flowing into said exhaust gas purification device with an HC amount that can be consumed, and the reductant is supplied into the exhaust gas at the supply amount. With this, the amount of the reductant in the flowing exhaust gas can be decreased, and minimization of mileage deterioration and inhibition of deterioration of the exhaust gas component can be easily attempted.

Further, there is an exhaust gas purification device formed by providing one or more of an oxidation catalyst, a diesel particulate filter with a catalyst, a NOx adsorption catalyst, a direct reduction type NOx catalyst, and a selective contact catalyst (a SCR catalyst) as said exhaust gas purification device. The above-described method of controlling the exhaust gas purification system can be applied to these devices.

Then, the exhaust gas purification system to achieve the objectives as described above provided with an exhaust gas purification device in an exhaust passage of an internal combustion engine, and at the same time, provided with a reductant supply means that supplies the reductant into the exhaust gas flowing into said exhaust gas purification device while adjusting the supply amount and the supply period of the reductant, an exhaust gas temperature detection means that detects the temperature of the exhaust gas, and an exhaust gas component concentration detection means that detects the oxygen concentration, the CO concentration, and the HC concentration in the exhaust gas, and that has a control device such that the reductant supply means performs a control of the supply of the reductant into the exhaust gas flowing into said exhaust gas purification device when the temperature of the exhaust gas detected with said exhaust gas temperature detection means is a prescribed judgment temperature or more, is configured so that said control device uses two or more of the oxygen concentration, the CO concentration, and the HC concentration of the exhaust gas detected by using said exhaust gas component concentration detection means as a control parameter at the time of the reductant supply control of the supply of the reductant.

Further, when supplying the reductant in the above-described exhaust gas purification system, said control device is configured so that said judgment temperature is set from the oxygen concentration, the CO concentration, and the HC concentration of the exhaust gas flowing into said oxidation catalyst that are detected with said exhaust gas component concentration detection means based on the relationship of the oxygen concentration, the CO concentration, and the HC concentration of the exhaust gas flowing into said exhaust gas purification device with the prescribed judgment temperature.

Further, when supplying the reductant in the above-described exhaust gas purification system, said control device is configured so that the supply amount of the reductant supplied into the exhaust gas is calculated and set from the temperature, the oxygen concentration, the CO concentration, and the HC concentration of the exhaust gas flowing into said exhaust gas purification device based on the relationship of the temperature, the oxygen concentration, and the CO concentration of the exhaust gas flowing into said exhaust gas purification device with an HC amount that can be consumed, and the reductant is supplied into the exhaust gas at the supply amount.

Further, there is an exhaust gas purification device formed by providing one or more of an oxidation catalyst, a diesel particulate filter with a catalyst, a NOx adsorption catalyst, a direct reduction type NOx catalyst, and a selective contact catalyst as the exhaust gas purification device of this exhaust gas purification system.

According to these exhaust gas purification systems, the above-described method of controlling an exhaust gas purification system can be carried out, and the same effect can be produced.

Effect of the Invention

According to the method of controlling an exhaust gas purification system and the exhaust gas purification system relating to the present invention, the supply period and the supply amount of the reductant can be made optimum and the performance of the catalyst can be brought out sufficiently by paying attention to the relationship of the activation temperature of the catalyst in the exhaust gas purification device with the oxygen concentration, the CO concentration, and the HC concentration in the exhaust gas, and using two or more of the oxygen concentration, CO concentration, and HC concentration as a control parameter at the time of the reductant supply control. With this, mileage deterioration can be minimized, and at the same time, inhibition of deterioration of the exhaust gas component at the HC injection can be attempted.

BEST MODE FOR CARRYING OUT THE INVENTION

The method of controlling an exhaust gas purification system and the exhaust gas purification system in accordance with the embodiment of the present invention are explained below while referring to drawings with the case of arranging the oxidation catalyst in the upstream side and the filter with a catalyst (DPF) in the downstream side as an example.

Moreover, the present invention is not limited to this example, and the exhaust gas purification device of the exhaust gas purification system can be applied also to the exhaust gas purification device formed by providing with one or more of an oxidation catalyst, a diesel particulate filter with a catalyst, a NOx adsorption catalyst, a direct reduction type NOx catalyst, a selective contact catalyst, a direct reduction type NOx catalyst, and a three way catalyst for a lean burn engine.

Figure 1:
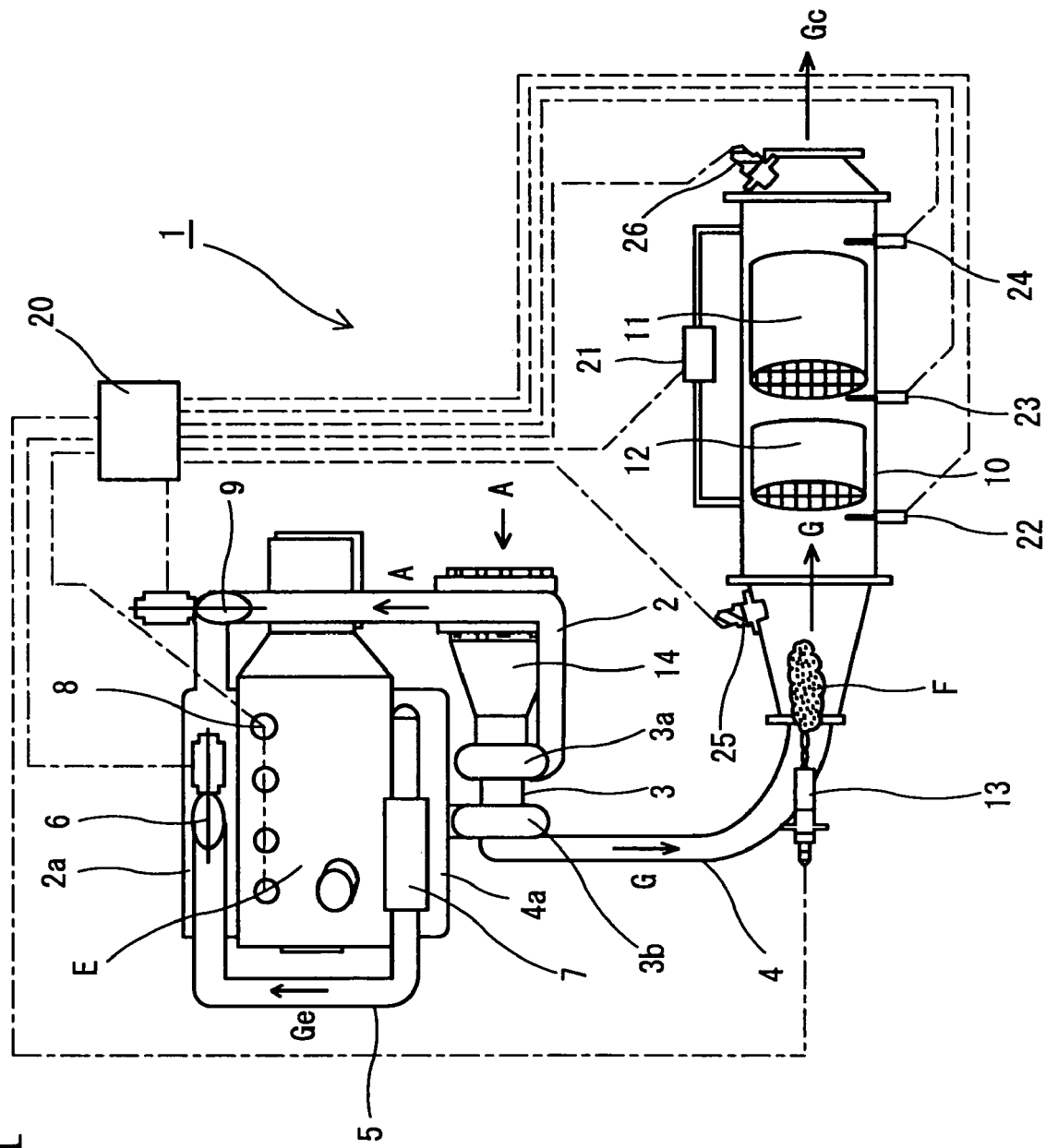
FIG. 1 is a drawing showing the configuration of the exhaust gas purification system in accordance with the embodiment of the present invention.

A configuration of an exhaust gas purification system 1 in accordance with the embodiment of the present invention is shown in FIG. 1. In this exhaust gas purification system 1, a turbine 3b of a turbo charger 3, an HC supply device 13, and an exhaust gas purification device 10 are arranged in an exhaust passage 4 of a diesel internal combustion engine E. This exhaust gas purification device 10 is one of a continuous regeneration type DPF (diesel particulate filter) device, and is configured by having an oxidation agent 12 in the upstream side and a filter with a catalyst 11 in the downstream side.

This oxidation catalyst 12 is formed applying an aluminum oxide catalyst carrying platinum onto a carrier with a porous ceramic honeycomb structure, etc. such as a cordierite honeycomb. The filter with a catalyst 11 is formed with a monolithic honeycomb type wall flow type filter etc. in which the entrance and the exit of a channel of a porous ceramic honeycomb are alternatively sealed. PM (particulate matter) in an exhaust gas G is trapped by a porous ceramic wall. The catalyst such as platinum and cerium oxide is carried in this filter part.

The HC supply device 13 is a reductant supply means. Unburnt HC such as a fuel is supplied into the exhaust gas by the HC supply device 13 in the case that the exhaust gas temperature is low at the time of the PM regeneration control of the filter with a catalyst 11. This unburnt HC is oxidized through the oxidation catalyst 12. The exhaust gas temperature is increased through this oxidation heat. The PM trapped is combusted and removed by flowing the exhaust gas with a high temperature into the filter with a catalyst 11. Moreover, this HC supply device 13 does not have to be provided in the case of performing the supplying of the unburnt HC into the exhaust gas with a post injection at the fuel injection in the cylinder.

A mass air-flow sensor (MAF sensor) 14, a compressor 3$a$ of a turbo charger 3, an intake air throttle valve 9, etc. are provided in an air-intake passage 2. This intake air throttle valve 9 adjusts the amount of intake air A entering an intake air manifold 2$a$. Further, an EGR passage 5 is provided in which EGR gas Ge that is a part of the exhaust gas is re-circulated from the exhaust manifold 4$a$ side to the intake air manifold 2$a$. An EGR cooler 7 and an EGR valve 6 are provided in this EGR passage 5.

Then, a differential pressure sensor 21 is provided in a conducting pipe connected to the front and the rear of the exhaust gas purification device 10 in order to estimate the accumulated amount of PM in the filter with a catalyst 11. Further, an oxidation catalyst entrance exhaust temperature sensor 22 is provided in the upstream oxidation catalyst 12, and a catalyst exit exhaust temperature sensor 23 is provided between the oxidation catalyst 12 and the filter with a catalyst 11 for the regeneration control of the filter with a catalyst 11. Furthermore, a filter exit exhaust temperature sensor 24 is provided in the downstream filter with a catalyst 11. The exhaust gas temperature detection means is configured with these temperature sensors 22, 23, and 24.

This oxidation catalyst entrance exhaust temperature sensor 22 detects the first measurement exhaust gas temperature T1$m$ that is the temperature of the exhaust gas flowing into the oxidation catalyst 12. Further, the catalyst exit exhaust temperature sensor 23 detects the second measurement exhaust gas temperature T2$m$ that is the temperature of the exhaust gas flowing out of the oxidation catalyst 12. This second measurement exhaust gas temperature T2$m$ becomes the temperature of the exhaust gas flowing into the filter with a catalyst 11. The filter exit exhaust temperature sensor 24 monitors the combustion state of PM in the filter with a catalyst 11 in order to be able to cope with the case that runaway combustion of PM occurs by any chance.

Further, gas component concentration sensors (sensors detecting the oxygen concentration, the CO concentration, and the HC concentration) 25 and 26 are arranged in the upstream side of the oxidation catalyst 12 and the downstream side of the filter with a catalyst 11. The exhaust gas composition concentration detection means is configured with these sensors 25 and 26. The upstream gas component concentration sensor 25 is for controlling when HC is supplied into the exhaust gas. The downstream gas component concentration sensor 26 is to monitor the gas component of the exhaust gas flowing out to the downstream side of the exhaust gas purification device 10, and to prevent degradation in the exhaust gas.

The output values of these sensors are input to a control device (ECU: engine control unit) 20 that performs the general control of operation of the engine E, and at the same time, also performs the regeneration control of the exhaust gas purification device 10. The intake air throttle valve 9, a fuel injection device (injection nozzle) 8, the EGR valve 6, etc are controlled with a control signal output from this control device 20.

In this exhaust gas purification system 1, air A passes an air cleaner (not shown), the mass air flow sensor 14 of the air-intake passage 2, and the compressor 3$a$ of the turbo charger 3. After that, an amount of the air A is adjusted by the intake air throttle valve 9, and air A enters into a cylinder from the intake air manifold 2$a$. Then, the exhaust gas G generated in the cylinder flows out of the exhaust manifold 4$a$ to the exhaust passage 4, and drives the turbine 3$b$ of the turbo charger 3. After that, the exhaust gas G passes the exhaust gas purification device 10 and becomes a purified exhaust gas Gc, passes a muffler that is not shown, and is exhausted in the atmosphere. Further, a part of the exhaust gas G passes the EGR cooler 7 in the EGR passage 5 as EGR gas Ge. An amount of this EGR gas Ge is adjusted at the EGR valve 6, and is re-circulated to the intake air manifold 2$a$.

Then, the control device of the exhaust gas purification system 1 is configured being incorporated into the control device 20 of the engine E. This control device of the exhaust gas purification system 1 performs the control of the exhaust gas purification system including the PM regeneration control of the filter with a catalyst 11, etc. at the same time with the operation control of the engine E.

Next, a control of supplying the reductant into the exhaust gas in the present invention is explained.

Figure 3:
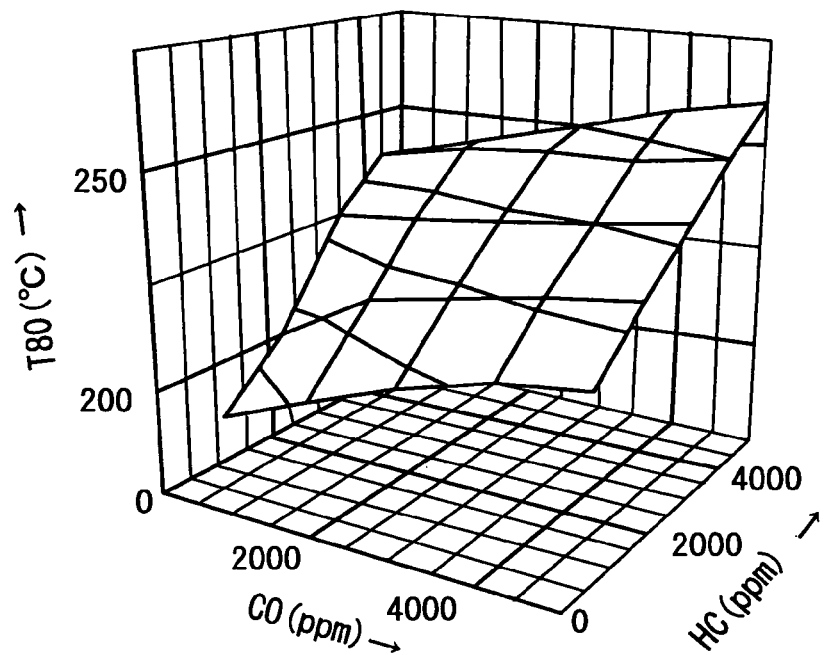
FIG. 3 is a drawing showing the relationship of the CO concentration and the HC concentration with the temperature at an 80% purification rate of HC at oxygen concentration 5%.
Figure 4:
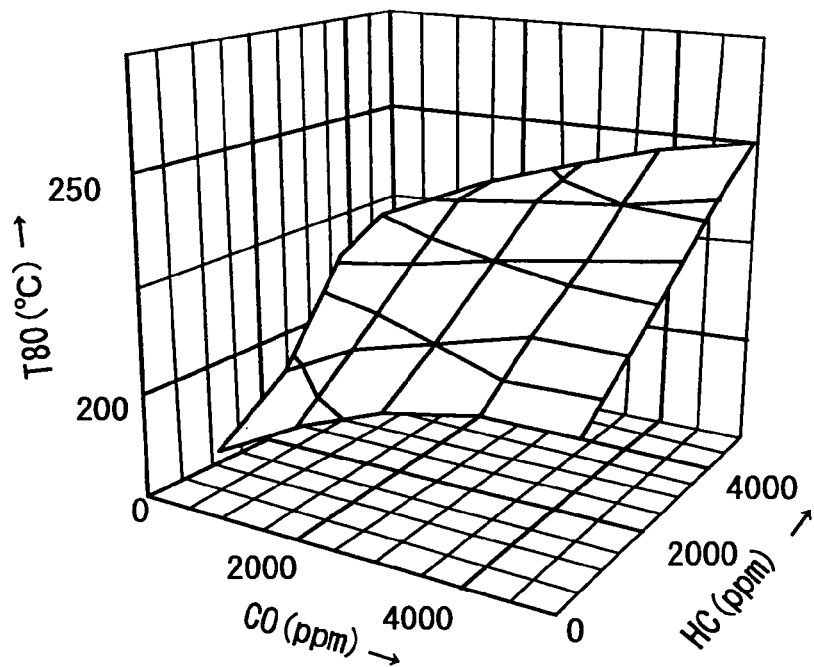
FIG. 4 is a drawing showing the relationship of the CO concentration and the HC concentration with the temperature at an 80% purification rate of HC at oxygen concentration 10%.
Figure 5:
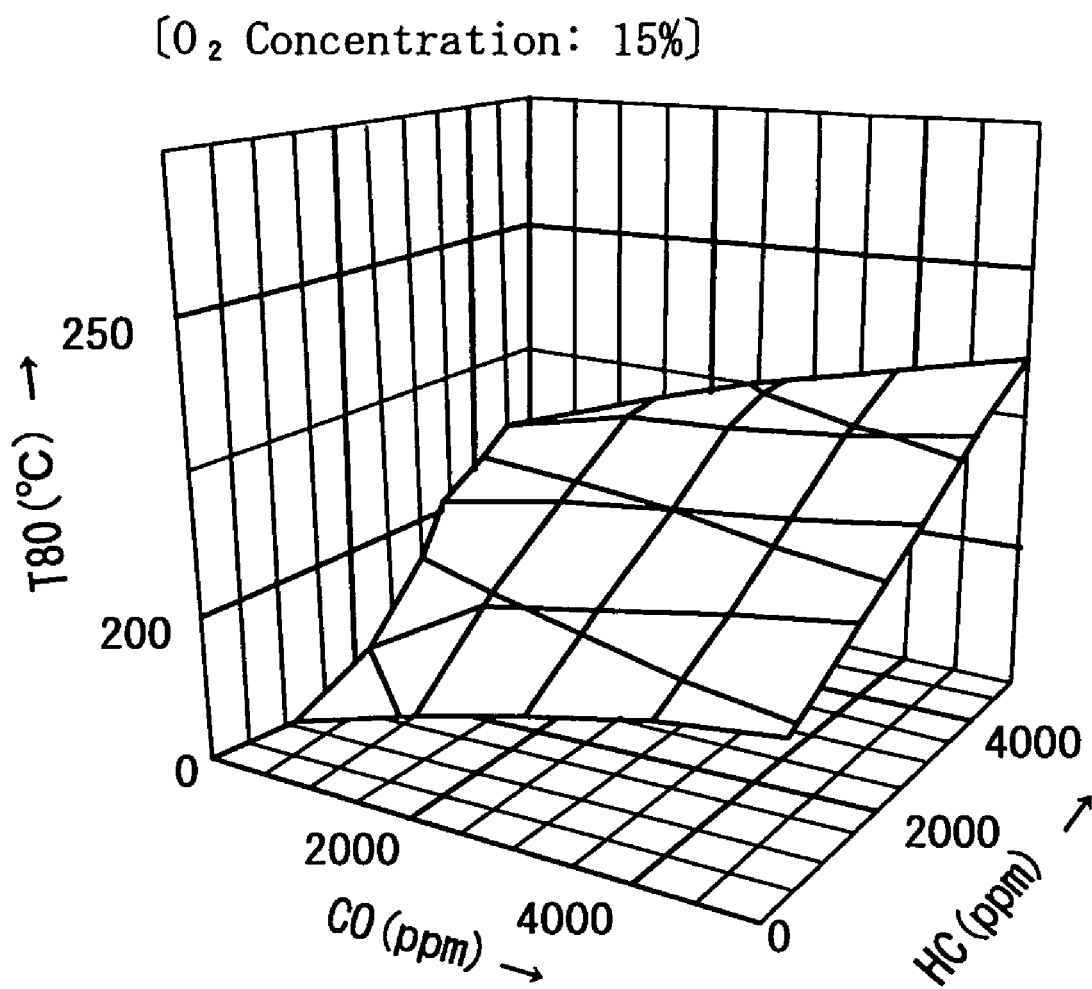
FIG. 5 is a drawing showing the relationship of the CO concentration and the HC concentration with the temperature at an 80% purification rate of HC at oxygen concentration 15%.

For this control, data for light-off of the oxidation catalyst 12 as shown in FIGS. 3 to 5 are prepared in advance, and memorized in the control device 20. This data for light-off is obtained as follows.

Before deterioration, or in other words, in a new catalyst, the HC purification rate $\eta$hc that shows the degree of the catalyst activation in the oxidation catalyst 12 is measured by changing the temperature Tgi, the oxygen concentration $C_{O2}$, the CO concentration Cco, and the HC concentration Chc of the exhaust gas flowing into the oxidation catalyst 12 by changing the operation state of the engine and the exhaust gas temperature.

From this measurement result, the temperature Tgi of the exhaust gas that becomes a prescribed HC purification rate $\eta$hc is obtained when making the oxygen concentration $C_{O2}$, the CO concentration Cco, and the HC concentration Chc as parameters as shown in FIGS. 3 to 5. This temperature Tgi is made to be a prescribed judgment temperature, and a database such as map data is made. In the case that determination criteria of the activation of the oxidation catalyst 12 is made to be 80% purification rate for example, the temperature of the exhaust gas at this 80% purification rate is made to be a prescribed judgment temperature T80. These data are made into map data, and memorized in the control device 20 in advance.

The prescribed judgment temperature T80 in the case of that oxygen concentration $C_{O2}$ is 5%, 10%, and 15% are shown in FIGS. 3 to 5 with the CO concentration Cco and the HC concentration Chc (moreover, $C_3H_6$ is used as a typical value of HC in FIGS. 3 to 5) as parameters.

Moreover, in the conventional art, this prescribed judgment temperature T80 is obtained by changing only temperature Tgi of the exhaust gas in a typical exhaust gas component of a diesel engine, and the prescribed judgment temperature to the purification rate of HC was simply one to one. Then, only one prescribed judgment temperature when the supply of the reductant into the oxidation catalyst 12 is started was obtained from these data.

Further, the HC purification rate $\eta$hc is obtained from the measurement result, when the temperature Tgi, the oxygen concentration $C_{O2}$, the CO concentration Cco, and the HC concentration Chc of the exhaust gas are made to be parameters, that is similar to FIGS. 3 to 5. These data are rearranged and a database is made in the form of map data, etc. as being related to the relationship of the temperature Tgi, the oxygen concentration $C_{O2}$, and the CO concentration Cco of the exhaust gas with the HC concentration Cthc in which HC can be consumed at a prescribed objective purification rate ηphc. This database is memorized in the control device 20 in advance.

Figure 2:
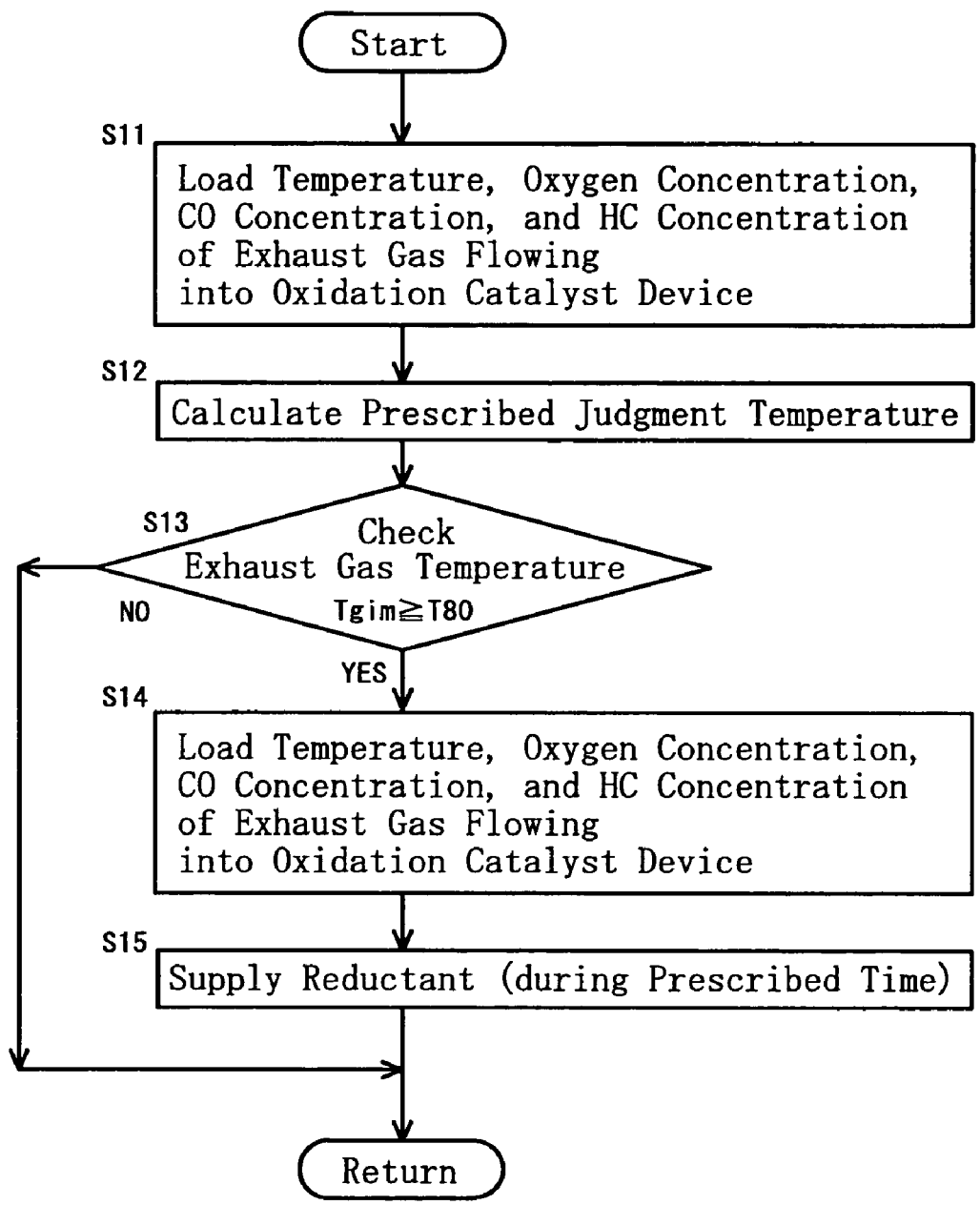
FIG. 2 is a drawing showing one example of the control flow in accordance with the embodiment of the present invention.

Then, the supply of the reductant into this oxidation catalyst 12 can be performed with a control flow exemplified in FIG. 2. Moreover, the control flow in FIG. 2 is shown as a part of the control flow of the exhaust gas purification system 1 carried out at the same time with other control flows of engine E at the operation of the engine E. The control flow in FIG. 2 is called from the main control flow of this exhaust gas purification system 1 and is carried out when the supply of the reductant is necessary, and returns, and is carried out repeatedly.

Regeneration control to combust and remove PM is necessary when the accumulated amount of PM increases in the filter with a catalyst 11 and a differential pressure value detected by the differential pressure sensor 21 becomes a prescribed differential pressure for determination for regeneration start determination or more. In order to increase the temperature of the exhaust gas flowing into the filter with a catalyst 11 at this regeneration control, the exhaust gas temperature exhausted from the engine E is increased and the exhaust gas temperature is increased through supplying the reductant to the oxidation catalyst 12. The control flow in FIG. 2 is called as a part of the control of the increase of the exhaust gas temperature.

When the control flow in FIG. 2 is started by being called from the main control flow, each detection value Tgim, $C_{O2m}$, Ccom, and Chcm of the temperature Tgi, the oxygen concentration $C_{O2}$, the CO concentration Cco, and the HC concentration Chc of the exhaust gas flowing into the oxidation catalyst 12 from the engine (internal combustion engine) E in a step S11 is loaded.

The map data corresponding to FIGS. 3 to 5 are referred to in the step S12. The prescribed judgment temperatures T80 corresponding to these detected values $C_{O2m}$, Ccom, and Chcm are calculated using interpolation depending on necessity.

The detected temperature of the exhaust gas Tgim is compared with this prescribed judgment temperature T80 in a step S13. In the case that the temperature of the exhaust gas Tgim is lower than this prescribed judgment temperature T80, it is considered that the supply of the reductant is not performed and the flow returns. Further, in the case that the temperature of the exhaust gas Tgim is this prescribed judgment temperature T80 or more, it is considered that the supply of the reductant is performed and it proceeds to a step S14.

In the step S14, the temperature Tgim, the oxygen concentration $C_{O2m}$, the CO concentration Ccom, and the HC concentration Chcm flowing into the oxidation catalyst 12 are loaded.

In a step S15, the reductant is supplied. An HC amount Thc that can be consumed in the oxidation catalyst 12 is calculated. An HC amount Ahc that should be supplied is calculated by considering the HC concentration Chcn in the exhaust gas. The reductant is supplied so that it becomes this calculated HC amount Ahc.

The calculation of this HC amount Ahc that should be supplied is similar to FIGS. 3 to 5. In this calculation, the HC concentration corresponding to the objective HC purification rate ηphc is calculated based on the data showing the relationship of the temperature Tgi, the oxygen concentration $C_{O2}$, the CO concentration Cco, and the HC concentration Chc of the exhaust gas flowing into the oxidation catalyst 12 with the objective HC purification rate ηphc in the case that the exhaust gas flowing into the oxidation catalyst 12 has a temperature Tgim, an oxygen concentration $C_{O2m}$, and a CO concentration Ccom. This HC concentration is the HC concentration Cthc that can be consumed with the oxidation catalyst 12.

Next, the HC supplying amount Thc that can be consumed is calculated by multiplying the HC concentration Cthc showing the HC amount that can be consumed with this oxidation catalyst 12 by the exhaust gas amount Wg. This exhaust gas amount Wg can be calculated by adding the fuel amount Wq that is supplied to the engine E to the intake air amount Wa detected by the mass air-flow sensor 14. Further, the HC amount Ghc contained in the exhaust gas is calculated by multiplying the HC concentration Chcm of the exhaust gas by the exhaust gas amount Wg.

Then, the HC amount Ahc that should be supplied by the HC supply device 13 is calculated by a value in which the HC amount Ghc in the exhaust gas is subtracted from the HC amount Thc that can be consumed, that is Ahc=Thc−Ghc. The supply of the reductant is performed with this HC amount Ahc that should be supplied for a prescribed time, and the flow returns.

Then, if the supply of the reductant is necessary in the main control flow, the control flow of FIG. 2 is called again, and the above-described steps S11 to S15 are repeated.

On the other hand, when the regeneration due to the combustion and removal of PM in the filter with a catalyst 11 proceeds and the differential pressure value of the differential pressure sensor 21 detected by the differential pressure sensor 21 becomes a prescribed differential pressure for determination for determining the completion of the regeneration or less, the control flow of FIG. 2 becomes unnecessary because the regeneration control is completed. Further, the control flow of FIG. 2 becomes unnecessary in the case that the temperature of the exhaust gas flowing into the filter with a catalyst 11 has become high and the combustion and removal of PM is possible even when the reductant is not supplied.

Then, the control flow of FIG. 2 is not called from the main control flow in the case that the control flow in FIG. 2 becomes unnecessary.

According to this control flow of FIG. 2, the prescribed judgment temperature T80 at the supply of the reductant can be calculated and set in the step S12 from the oxygen concentration $C_{O2m}$, the CO concentration Ccom, and the HC concentration Chcm of the exhaust gas flowing into the oxidation catalyst 12 detected with the exhaust gas component concentration detection means based on the relationship of the oxygen concentration $C_{O2}$, the CO concentration Cco, and the HC concentration Chc of the exhaust gas flowing into the oxidation catalyst 12 with the prescribed judgment temperature T80. Therefore, the prescribed judgment temperature can be made more appropriate and making a supply starting time of the reductant can be attempted.

Further, the HC amount Ahc that should be supplied at the supply of the reductant can be calculated and set in the step S15 from the temperature Tgim, the oxygen concentration $C_{O2m}$, the CO concentration Ccom, and the HC concentration Chcm of the exhaust gas flowing into the oxidation catalyst 12 detected with the exhaust gas component concentration detection means based on the relationship of the temperature Tgi, the oxygen concentration $C_{O2}$, the CO concentration Cco, and the HC concentration Chc of the exhaust gas flowing into the oxidation catalyst 12 with the objective HC purification rate ηphc.

That is, the reductant supply means calculates and sets the supply amount Ahc of the reductant supplied into the exhaust gas from the temperature Tgim, the oxygen concentration $C_{O2m}$, the CO concentration Ccom, and the HC concentration Chcm of the exhaust gas flowing into the oxidation catalyst 12 detected with the exhaust gas component concentration detection means based on the relationship of the temperature Tgi, the oxygen concentration $C_{O2}$, the CO concentration Cco with the HC concentration Chc that can be consumed at the objective HC purification rate ηphc of the exhaust gas flowing into the oxidation catalyst 12, and supplies the reductant with this supply amount Ahc into the exhaust gas. With this, the sum of the amount of the reductant that is supplied and the amount of the reductant in the exhaust gas can be made to be the amount of the reductant that can be consumed by the oxidation catalyst 12. Therefore, minimization of mileage deterioration can be attempted, and at the same time, deterioration of the components of the exhaust gas can be inhibited.

Moreover, the exhaust gas purification system 1 combining the upstream oxidation catalyst 12 and the downstream filter with a catalyst (DPF) 11 is used in the above explanation. However, the present invention can be applied to an exhaust gas purification system combining an upstream oxidation catalyst and a downstream NOx adsorption catalyst, an exhaust gas purification system combining an upstream oxidation catalyst and a downstream SCR catalyst, and an exhaust gas purification system combining an oxidation catalyst, a NOx purification catalyst, and a DPF.

Further, the judgment temperature T80 of the exhaust gas temperature can be also used as the judgment temperature of the exhaust gas temperature in the NOx regeneration control of the NOx purification catalyst such as a NOx adsorption catalyst and a NOx direct reduction type catalyst, and desulfurization control for recovering from sulfur poisoning of various catalysts such as an oxidation catalyst, a NOx adsorption catalyst, a NOx direct reduction type catalyst, and a SCR catalyst, as well as the PM regeneration control exemplified above.

Further, the calculation of the supply amount of the reductant can be applied to an exhaust gas purification system combining an upstream oxidation catalyst and a downstream NOx adsorption catalyst, etc. as well as the oxidation catalyst. In this case, in order to perform the calculation more accurately, the first reductant amount of the reductant that can be consumed with the oxidation catalyst is calculated from the temperature, the oxygen concentration, the CO concentration, and the HC concentration of the exhaust gas flowing into the oxidation catalyst, the second reductant amount of the reductant that can be consumed with the NOx adsorption catalyst is calculated from the temperature, the oxygen concentration, the CO concentration, and the HC concentration of the exhaust gas flowing into the NOx adsorption catalyst, and the HC amount that should be supplied is calculated by subtracting the HC amount in the exhaust gas from the sum of the first reductant amount and the second reductant amount.

Next, an example and comparative example are explained. A carrier of cordierite honeycomb coated with an aluminum oxide catalyst carrying platinum was incorporated in a converter as the oxidation catalyst, and installed to the exhaust pipe of a diesel engine.

The relationship of the oxygen concentration, the CO concentration, and the HC concentration of the exhaust gas flowing into this oxidation catalyst with the light-off temperature was obtained, and the results in FIGS. 3 to 5 were obtained as the temperature T80 of 80% purification rate of HC. In the example, these relationships of FIGS. 3 to 5 were incorporated into control parameters with the temperature threshold value and the upper limit values of HC and CO at the HC injection, and the HC injection control was performed.

Next, the light-off temperature (the activation temperature) was obtained with a typical exhaust gas component of the used diesel engine, which resulted in 190° C. as the temperature T80 at 80% purification rate of HC. In a comparative example, this light-off temperature T80 was incorporated into the control parameter as the temperature threshold value at the HC injection, and the HC injection control was performed.

Figure 6:
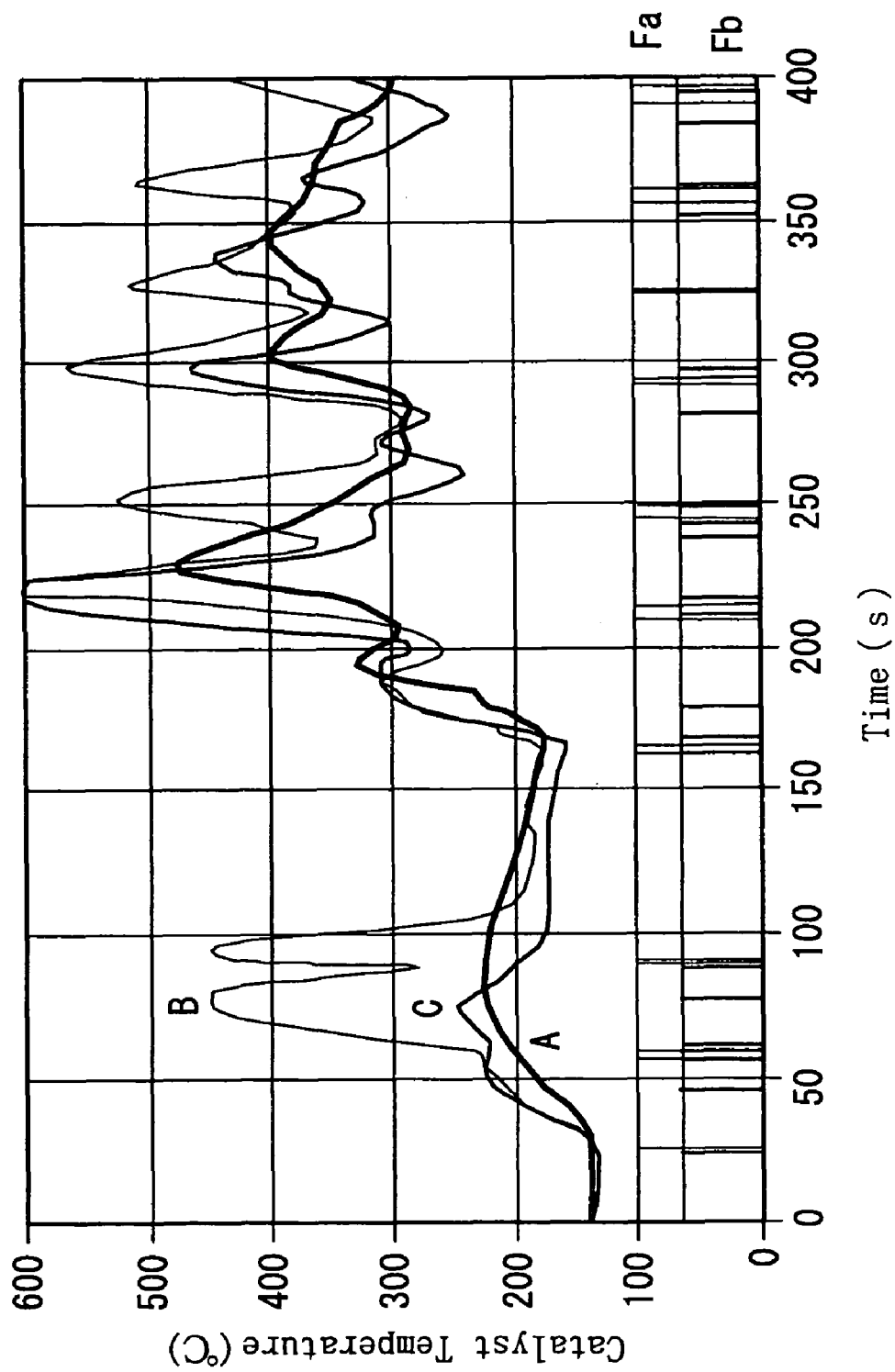
FIG. 6 is a drawing showing the change of the HC injection period and the exhaust gas temperature in an example and a comparative example.

The changes of the HC injection period and the exhaust gas temperature of the example and comparative example are shown in FIG. 6. A bold line A in FIG. 6 represents the exhaust gas temperature of the oxidation catalyst entrance, and a thin line B represents the catalyst temperature when the HC injection control (Fa) of the example is performed. A medium line C represents the catalyst temperature when the HC injection control (Fb) of the comparative example is performed. It can be found that the catalyst temperature is increasing effectively in the thin line B compared with the medium line C.

Figure 7:
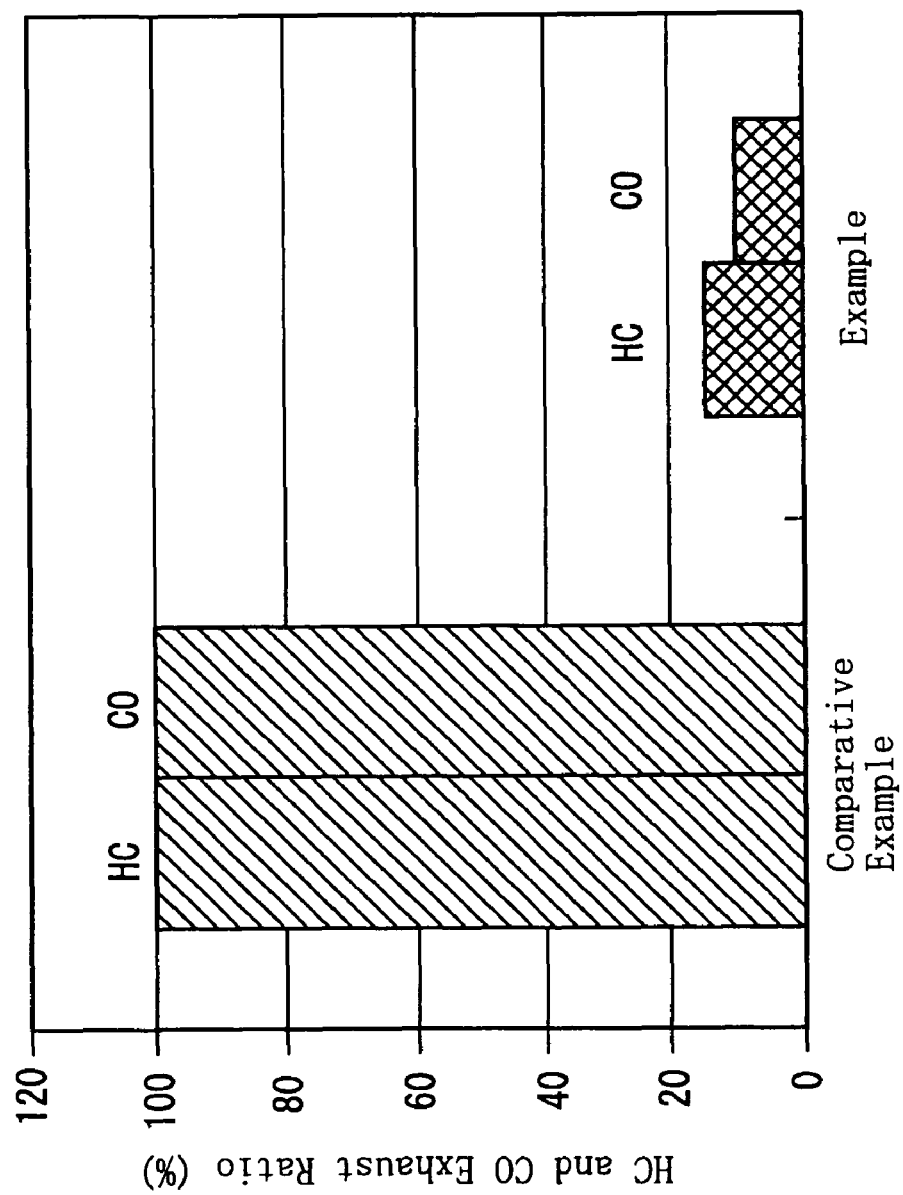
FIG. 7 is drawing showing the downstream HC concentration and CO concentration of the oxidation catalyst in an example and the comparative example being defined as 100.

Further, the HC concentration and the CO concentration in the downstream side of the oxidation catalyst are shown in FIG. 7 with a value of the example in the case that the comparative example is made to be 100. Further, the HC injection amount is shown in FIG. 8 with a value of the example in the case that the comparative example is made to be 100.

Figure 8:
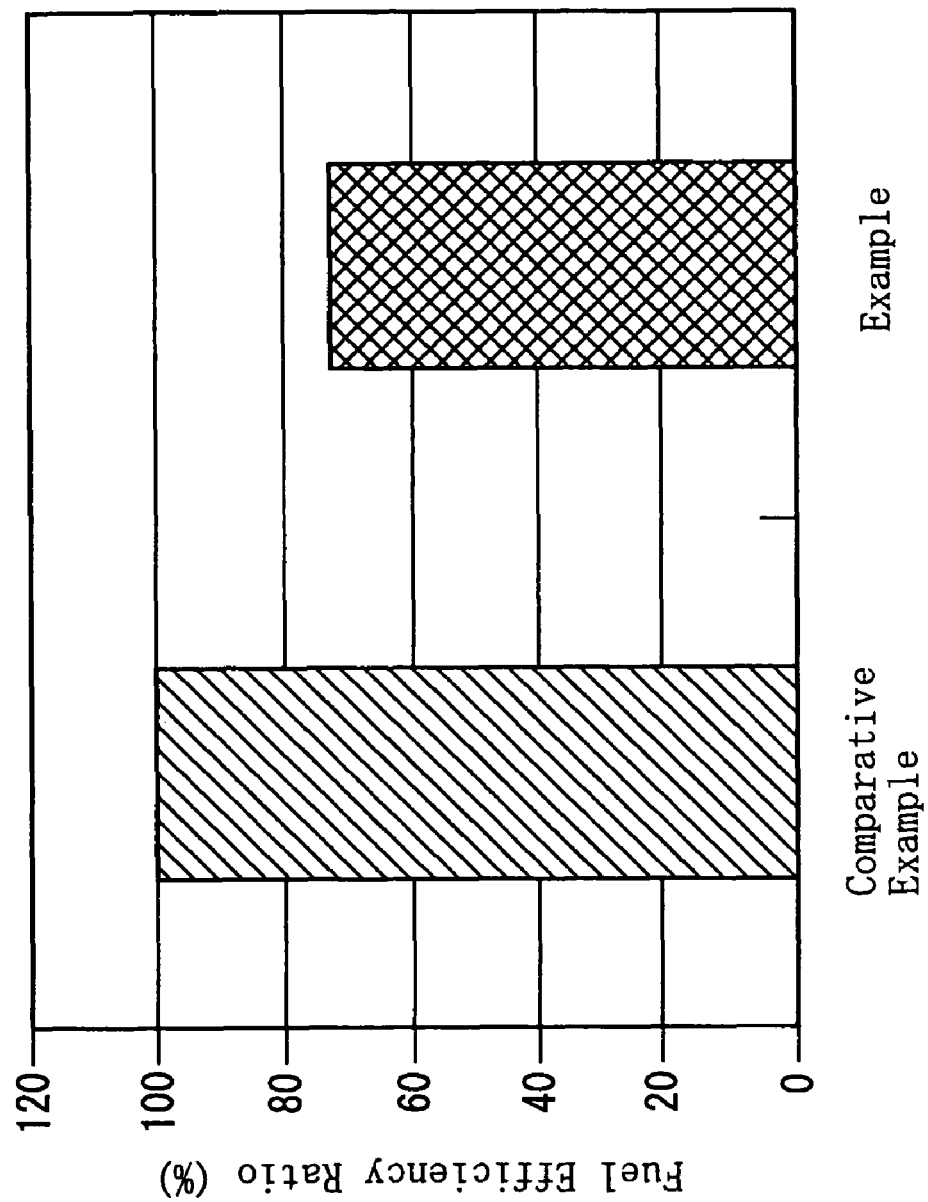
FIG. 8 is a drawing showing the HC injection amount of an example and the comparative example being defined as 100.

From these results of FIGS. 6 to 8, it is found that the exhaust gas temperature can be increased effectively, the exhaust gas components can be inhibited, and the mileage deterioration can be minimized.

INDUSTRIAL APPLICABILITY

The method of controlling an exhaust gas purification system and the exhaust gas purification system in the present invention having the above-described excellent effects have an exhaust gas purification device provided in an exhaust passage of an internal combustion engine, etc. loaded in automobiles, and at the same time, can be utilized very effectively on an exhaust gas purification system provided with a reductant supply means that supplies the reductant in the upstream side of this exhaust gas purification device.

What is claimed is:

1. A method of controlling an exhaust gas purification system provided with an exhaust gas purification device in an exhaust passage of an internal combustion engine, comprising:
   supplying a reductant into the exhaust gas flowing into the exhaust gas purification device while adjusting a supply amount and a supply period of the reductant;
   detecting a temperature of the exhaust gas;
   detecting an oxygen concentration, a CO concentration, and an HC concentration in the exhaust gas flowing into the exhaust gas purification device;
   controlling the reductant being supplied, when the detected temperature is a prescribed judgment temperature or more;
   using two or more of the detected oxygen concentration, the CO concentration, and the HC concentration as a control parameter when controlling the supply amount of the reductant; and
   setting the prescribed judgment temperature from the detected oxygen concentration, the CO concentration, and the HC concentration, based on a relationship of the oxygen concentration, the CO concentration, and the HC concentration and the prescribed judgment temperature when supplying the reductant.

2. The method of controlling an exhaust gas purification system described in claim 1, further comprising:
   setting the supply amount based on the detected temperature, the oxygen concentration, the CO concentration, and the HC concentration, based on a relationship of the temperature, the oxygen concentration, the CO concentration and an HC amount that can be consumed when supplying the reductant, and the reductant is supplied into the exhaust gas at the supply amount.

3. The method of controlling an exhaust gas purification system described in claim 1 wherein further comprising:
providing the exhaust gas purification device with one or more of an oxidation catalyst, a diesel particulate filter with a catalyst, a NOx adsorption catalyst, a direct reduction type NOx catalyst, and a selective contact catalyst.

4. An exhaust gas purification system, comprising:
an exhaust gas purification device in an exhaust passage of an internal combustion engine,
a reductant supplier that supplies a reductant into an exhaust gas flowing into the exhaust gas purification device while adjusting a supply amount and a supply period of the reductant;
a detector that detects a temperature of the exhaust gas;
an exhaust gas component concentration detector that detects an oxygen concentration, a CO concentration, and an HC concentration in the exhaust gas flowing into the exhaust gas purification device;
a control device for controlling the reductant being supplied into the exhaust gas flowing into the exhaust gas purification device, when the detected temperature is a prescribed judgment temperature or more,
wherein the control device uses two or more of the detected oxygen concentration, the CO concentration, and the HC concentration as a control parameter, when controlling the supply amount of the reductant, and
wherein the control device sets the prescribed judgment temperature from the detected oxygen concentration, the CO concentration, and the HC concentration, based on a relationship of the oxygen concentration, the CO concentration, and the HC concentration and the prescribed judgment temperature, when supplying the reductant.

5. The exhaust gas purification system described in claim 4, wherein the control device calculates and sets the supply amount of the reductant supplied into the exhaust gas from the temperature, the oxygen concentration, the CO concentration, and the HC concentration based on the relationship of the temperature, the oxygen concentration, the CO concentration with the HC amount that can be consumed at the supply of the reductant, and the reductant is supplied into the exhaust gas at the supply amount.

6. The exhaust gas purification system described in claim 4, wherein the exhaust gas purification device is provided with one or more of an oxidation catalyst, a diesel particulate filter with a catalyst, a NOx adsorption catalyst, a direct reduction type NOx catalyst, and a selective contact catalyst.

* * * * *